(12) United States Patent
Fruit et al.

(10) Patent No.: US 8,391,780 B2
(45) Date of Patent: Mar. 5, 2013

(54) SYSTEM AND METHOD OF SATELLITE COMMUNICATION THAT REDUCES THE DOPPLER FREQUENCY SHIFT OF THE SATELLITE SIGNALS

(75) Inventors: Larry J. Fruit, Kokomo, IN (US); Eric A. Dibiaso, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 1606 days.

(21) Appl. No.: 11/824,022

(22) Filed: Jun. 29, 2007

(65) Prior Publication Data

US 2010/0022185 A1 Jan. 28, 2010

(51) Int. Cl.
*H04B 7/185* (2006.01)
*H04B 7/19* (2006.01)
*H04B 1/00* (2006.01)
*H04B 7/00* (2006.01)
*H04B 7/212* (2006.01)
*H04W 4/00* (2009.01)
*G01S 19/25* (2010.01)
*G01S 1/24* (2006.01)

(52) U.S. Cl. ........ 455/12.1; 455/13.2; 455/71; 455/427; 342/353; 342/357.64; 342/387; 370/324; 375/143

(58) Field of Classification Search ................ 455/3.01, 455/3.02, 3.03, 3.04, 3.05, 3.06, 12.1, 13.1, 455/13.2, 13.4, 26.1, 63.1, 63.4, 277.1, 427, 455/431, 456.1, 502, 71, 428, 429, 442, 509, 455/517; 325/4, 584, 58; 342/99, 103, 104, 342/109, 120, 351, 352, 353, 354, 357.2, 342/357.42, 357.52, 357.64, 357.77, 365, 342/367, 387, 432, 457, 464; 370/315, 316, 370/324, 331; 701/472
See application file for complete search history.

(56) References Cited

U.S. PATENT DOCUMENTS

| | | | | |
|---|---|---|---|---|
| 5,008,679 | A * | 4/1991 | Effland et al. | 342/353 |
| 5,640,166 | A * | 6/1997 | Siwiak | 342/354 |
| 6,127,967 | A * | 10/2000 | Ghazvinian et al. | 342/354 |
| 6,356,740 | B1 * | 3/2002 | Malcolm et al. | 455/71 |
| 6,718,174 | B2 * | 4/2004 | Vayanos | 455/456.1 |
| 6,720,916 | B2 * | 4/2004 | Christensen et al. | 342/357.52 |
| 6,965,753 | B1 | 11/2005 | Miller et al. | |
| 8,059,025 | B2 * | 11/2011 | D'Addio | 342/120 |
| 2005/0251725 | A1 * | 11/2005 | Huang et al. | 714/752 |
| 2007/0021121 | A1 | 1/2007 | Lane et al. | |
| 2007/0281611 | A1 * | 12/2007 | Monte et al. | 455/13.2 |

FOREIGN PATENT DOCUMENTS

WO 01/17129 A1 3/2001

OTHER PUBLICATIONS

European Search Report dated Dec. 14, 2012.

* cited by examiner

*Primary Examiner* — Yuwen Pan
*Assistant Examiner* — Paul P Tran
(74) *Attorney, Agent, or Firm* — Lawrence D. Hazelton

(57) ABSTRACT

A system and method of communicating signals is provided. The system includes a plurality of satellites, at least one receiver, and at least one satellite uplink station. The plurality of satellites include at least one active satellite. The at least one receiver is in communication with the plurality of satellites, and receives a signal from the at least one active satellite. The at least one satellite uplink station is in communication with the plurality of satellites, and transmits the signal and alters a frequency of the signal based upon a location of the at least one active satellite to reduce a Doppler frequency shift when activating and deactivating the plurality of satellites.

15 Claims, 5 Drawing Sheets

SYSTEM AND METHOD OF SATELLITE COMMUNICATION THAT REDUCES THE DOPPLER FREQUENCY SHIFT OF THE SATELLITE SIGNALS

TECHNICAL FIELD

The present invention generally relates to a system and method of satellite communication, and more particularly, to a system and method of satellite communication using a plurality of satellites and controlling the signal frequency.

BACKGROUND OF THE DISCLOSURE

Generally, vehicles can be equipped with satellite radio receivers as an alternative, or in combination with, traditional terrestrial radio receivers. Additionally, satellite radio receivers can be used in places other than vehicles, such as handheld devices or stationary devices, which are typically used in one's home. Generally, satellite radio systems are designed such that the receiver receives a satellite radio frequency (RF) signal from a satellite and a terrestrial RF signal from a terrestrial repeater or transponder.

Due to current European regulations, the European satellite radio system currently has twenty-three (23) contiguous frequencies across forty megahertz (40 MHz). Generally, there are seven (7) frequencies that are designated for hybrid systems only, which include the transmission of the satellite RF signal and the terrestrial RF signal. Typically, the current European satellite radio system is constrained to frequency bandwidths of 1.712 MHz. With multiple satellites, it can be a problem to receive signals from one satellite and then receive signals from another satellite due to the differing locations of the satellites with respect to the receiver.

SUMMARY OF THE INVENTION

According to one aspect of the present invention, a communication system includes a plurality of satellites, at least one receiver, and at least one satellite uplink station. The plurality of satellites includes at least one active satellite. The at least one receiver is in communication with the plurality of satellites, and receives a signal from the at least one active satellite. The at least one satellite uplink station is in communication with the plurality of satellites, and transmits the signal and alters a frequency of the signal based upon the location of the at least one active satellite to reduce a Doppler frequency shift at the at least one receiver when activating and deactivating the plurality of satellites.

According to another aspect of the present invention, a method of communicating signals includes the steps of providing a plurality of satellites, including at least one active satellite, and transmitting a signal at a frequency to the at least one active satellite. The method further includes the steps of altering the frequency of the signal based upon a location of the at least one active satellite to reduce a Doppler frequency shift when activating and deactivating the plurality of satellites, and receiving the signal transmitted by the plurality of satellites by the at least one receiver.

According to yet another aspect of the present invention, a method of communicating signals includes the steps of providing a plurality of satellites that include at least one active satellite, transmitting a signal at a frequency to the at least one active satellite, and continuously altering the frequency of the signal based upon a location of the at least one active satellite to reduce a Doppler frequency shift when activating and deactivating the plurality of satellites. The method further includes the steps of receiving the signal transmitted by the plurality of satellites by the at least one receiver, activating each of the plurality of satellites based upon a location of the plurality of satellites in an orbital path, and deactivating each of the plurality of satellites based upon a location of each of the plurality of satellites in the orbital path.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF PREFERRED EMBODIMENTS

Figure 1:
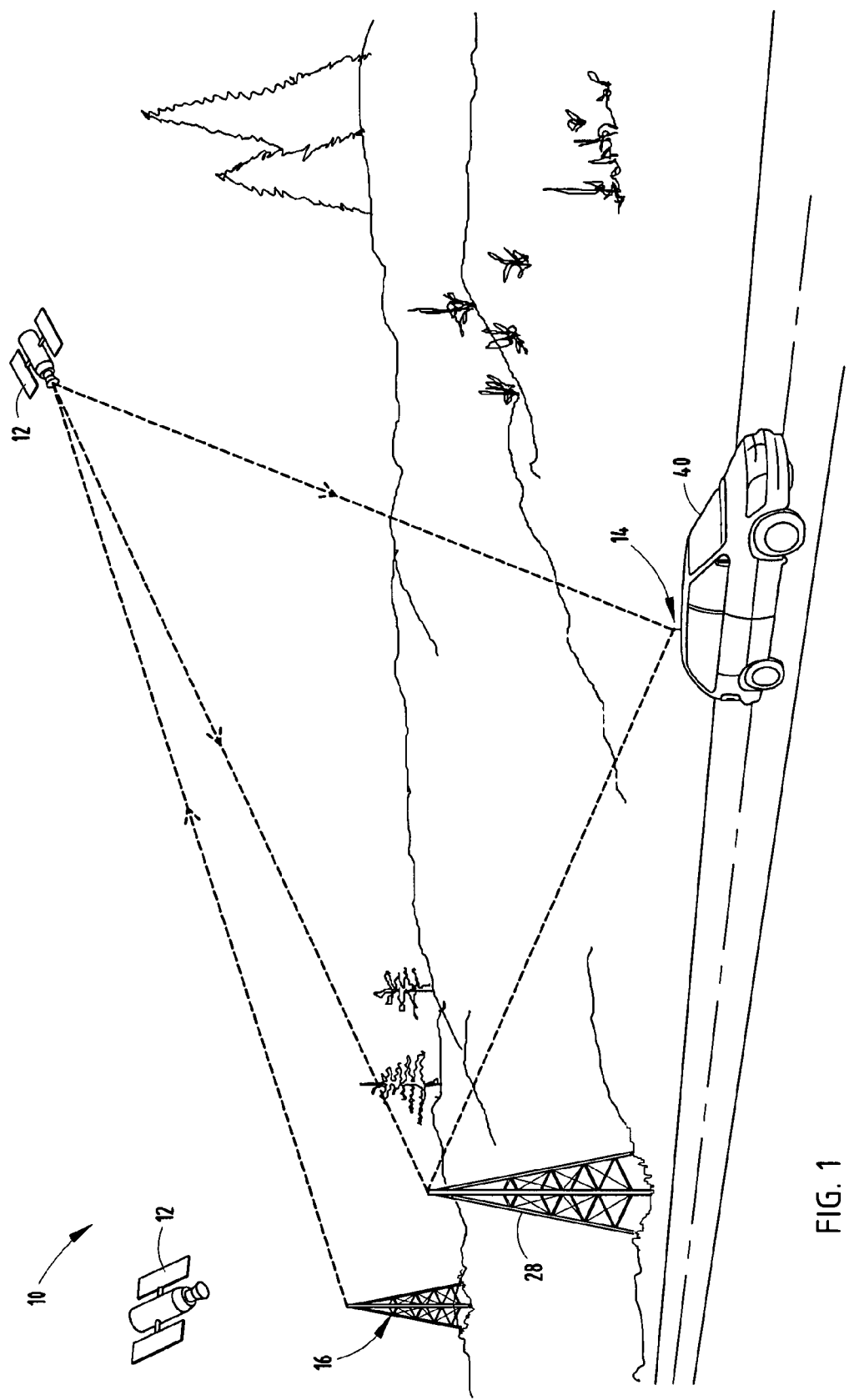
FIG. 1 is an environmental view of a communication system in accordance with one embodiment of the present invention.
Figure 2:
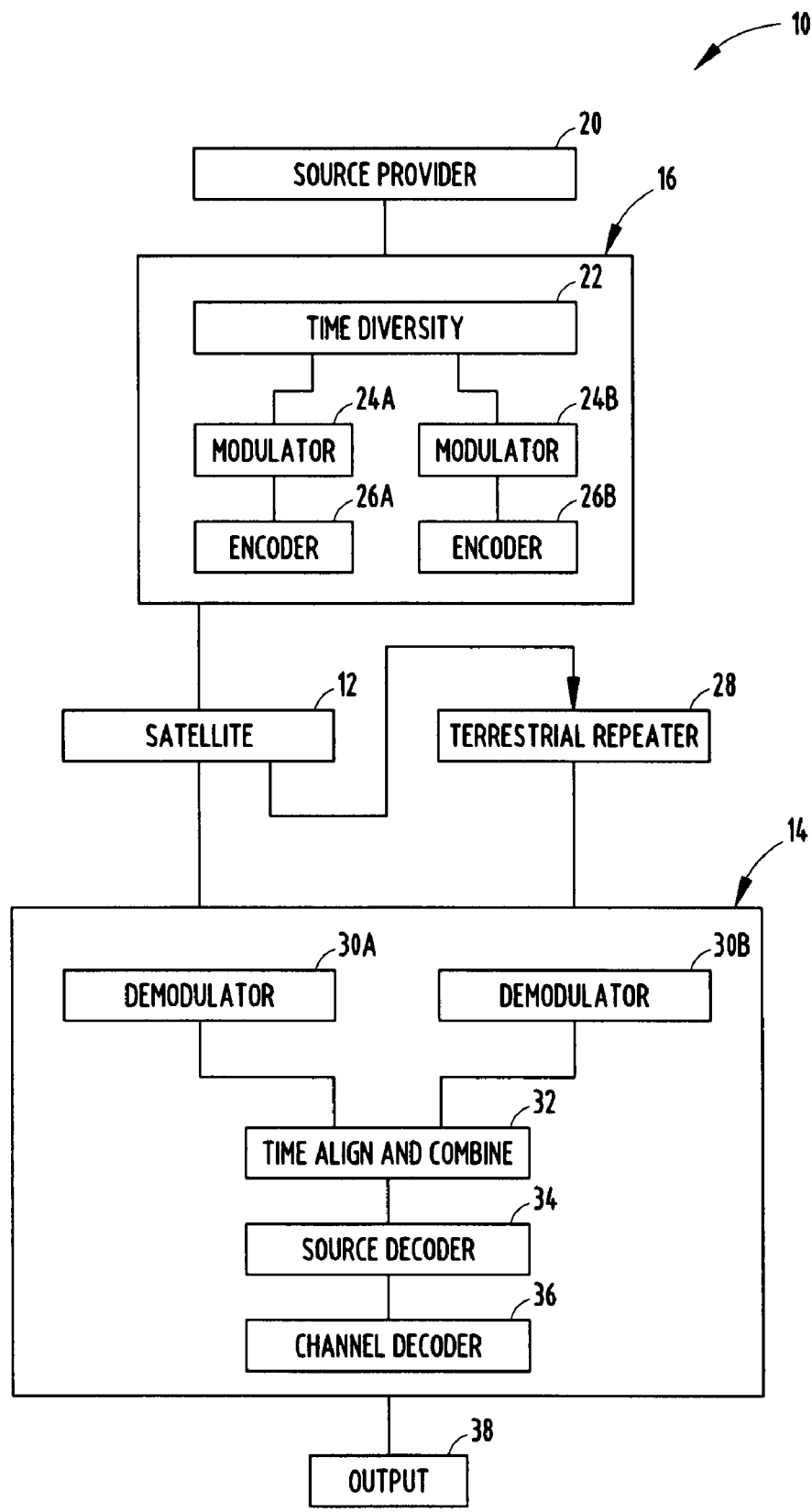
FIG. 2 is a block diagram of a communication system in accordance with one embodiment of the present invention.

In reference to both FIGS. 1 and 2, a communication system is generally shown at reference identifier 10. According to one embodiment, the communication system 10 includes a plurality of satellites 12 and at least one receiver 14 generally shown located onboard a vehicle 40. The receiver 14 is in communication with the satellites 12, and the receiver 14 receives a signal from at least one active satellite of the plurality of satellites 12. The communication system 10 also includes at least one transmitter or satellite uplink station 16, which is in communication with the satellites 12. The satellite uplink station 16 transmits a signal and alters the frequency of the signal based upon the location of the active satellite in order to reduce the Doppler frequency shifts at the receiver 14, as described in greater detail herein.

The communication system 10 is described herein in connection with a current European satellite system, according to one embodiment. It should be appreciated by those skilled in the art that other satellite systems may be used with the communication system 10 of the present invention. The current European satellite system includes a single pan-European receiving area and a plurality of other receive areas that are distributed about the European continent. Typically, there are nine different receive areas throughout Europe. Generally, the European satellite radio system uses highly elliptical orbit (HEO) satellites, where three or four satellites are spaced over an orbital path, which takes approximately twenty-four (24) hours per orbit. Generally, the satellite directly over the European continent is designated as the active satellite, which is transmitting the signal to the receive sites, while the remaining satellites are off and are not transmitting a signal. As the satellites continue in the orbital path, the active satellite changes, such that one satellite turns off while the other satellite turns on substantially simultaneously. For purposes of explanation and not limitation, the switching of the active satellite causes an instantaneous carrier frequency change of approximately 5000 to 6000 Hz due to the different Doppler frequency shifts between the two satellites.

Figure 3:
FIG. 3 is an environmental view of an exemplary highly elliptical orbit path in accordance with one embodiment of the present invention.

According to a disclosed embodiment shown in FIG. 3, the satellites 12 are HEO satellites, and travel along an exemplary orbital path 18. Typically, one of the satellites 12 is an active satellite, which is the satellite 12 that is currently orbiting over the European continent. The remaining satellites 12 that are not active are deactive satellites. Thus, the satellites 12 are designated as active and deactive satellites based upon their location within the orbital path 18, such that the active satellite is transmitting a satellite radio frequency (RF) signal, and the deactive satellites are not transmitting a signal.

According to one embodiment, data transmitted in the communication system 10 requires error correction coding that has very large coding gains, which requires the receiver 14 to operate at low signal-to-noise ratios. However, large Doppler shifts in the signal transmitted from the satellites 12 when one satellite is activated and another satellite is deactivated in combination with the receiver 14 operating at low signal-to-noise ratios (Eb/No) cause the receiver 14 to lose the phase lock loop and bit timing loop, since the receiver 14 is operating at low signal-to-noise ratios. Phase lock loop is generally a closed-loop feedback control system that responds to the frequency and phase of the input signal. The phase lock loop is typically used to stabilize a generated signal or to detect signals in the presence of noise. Bit timing is the time period for receiving one bit.

In reference to FIGS. 1-3, typically, a source provider 20 provides data, including source data, to the satellite uplink station 16. The satellite uplink station 16 can include a time diversity device 22 for transmitting the signal in a time diversity format, a first modulator 24A and a second modulator 24B for modulating the data, and a first encoder 26A and a second encoder 26B for encoding the data. It should be appreciated by those skilled in the art that the satellite uplink station 16 can include other suitable devices for processing the data prior to transmission. The satellite uplink station 16 then transmits or uplinks the data to the satellite 12. Thus, the data is typically transmitted as a satellite RF signal.

The satellite 12 receives the signal from the satellite uplink station 16, and the satellite 12 can transmit or downlink the signal to the receiver 14. According to a disclosed embodiment, the terrestrial repeater 28 can receive the signal from the satellite 12, and re-transmit the data as a terrestrial RF signal. Thus, the data can be transmitted in time and spatial diversity formats. Typically, the terrestrial repeater 28 demodulates the signal or data received or downlinked from the satellite 12, re-modulates the data, and re-transmits the data to the receiver 14. It should be appreciated by those skilled in the art that the terrestrial repeater 28 contains suitable circuitry and electrical components for demodulating and re-modulating the data, and other desirable signal processing techniques.

The data is being transmitted in spatial diversity because the data can be transmitted by the satellite 12 and the terrestrial repeater 28. Signals are transmitted in spatial diversity when multiple signal paths are used that are at different elevations with respect to the receiver 14 of the signals. Additionally, the data is transmitted in time diversity when the data is transmitted at different times, and then combined by the receiver 14, as described in greater detail below. By transmitting the data in time diversity, spatial diversity, or a combination thereof, the receiver 14 can correct errors in the received data and has a higher probability of receiving the signals.

According to one embodiment, the receiver 14 can include a first demodulator 30A and a second demodulator 30B, which are used to demodulate the received signals. The first and second demodulators 30A,30B must operate properly at low signal-to-noise ratios, such as maintaining phase lock loop and bit timing loop. Thus, the loop bandwidth of the phase lock loop is generally narrow, and typically cannot track very large carrier frequency shifts. The output of the first and second demodulators 30A,30B can be time aligned and combined by a time align and combine device 32. The signals can then be source decoded by a source decoder 34, and channel decoded by a channel decoder 36. The receiver 14 then emits an output 38, which can be an audio output, a visual output, or a combination thereof. According to one embodiment, the terrestrial repeater 28 can contain a similar type of circuitry for demodulating the received signal, and then re-modulate the signal that is transmitted to the receiver 14.

Figure 4:
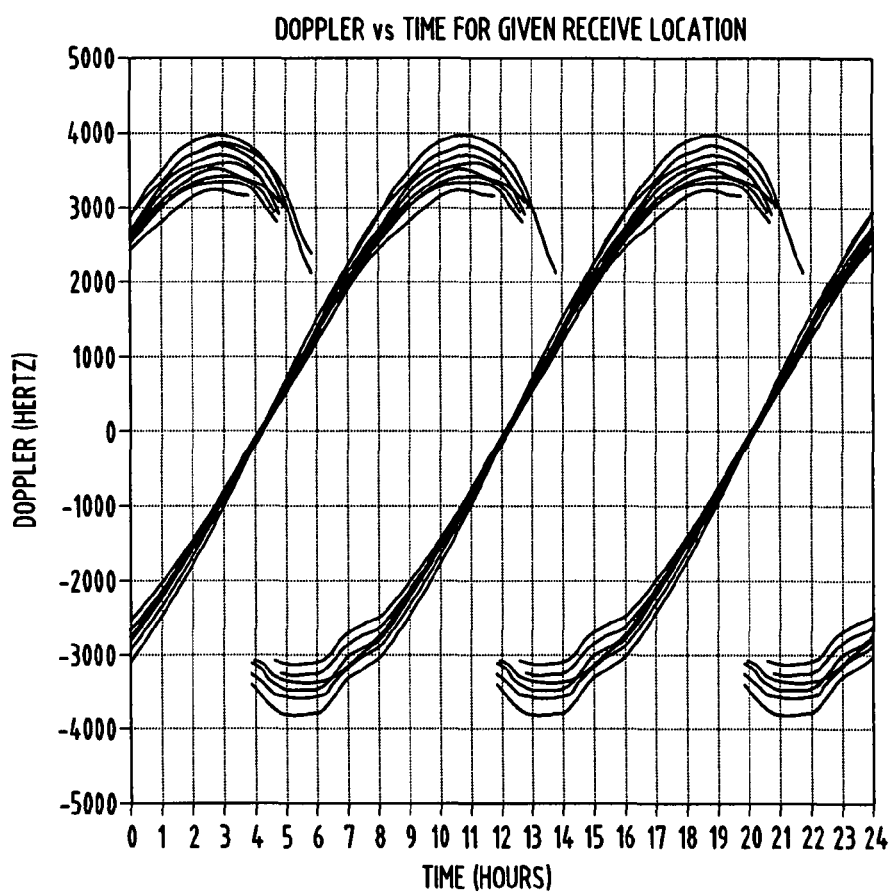
FIG. 4 is a chart illustrating one example of the Doppler shift relationship among satellites as the satellites move along an orbital path.
Figure 5:
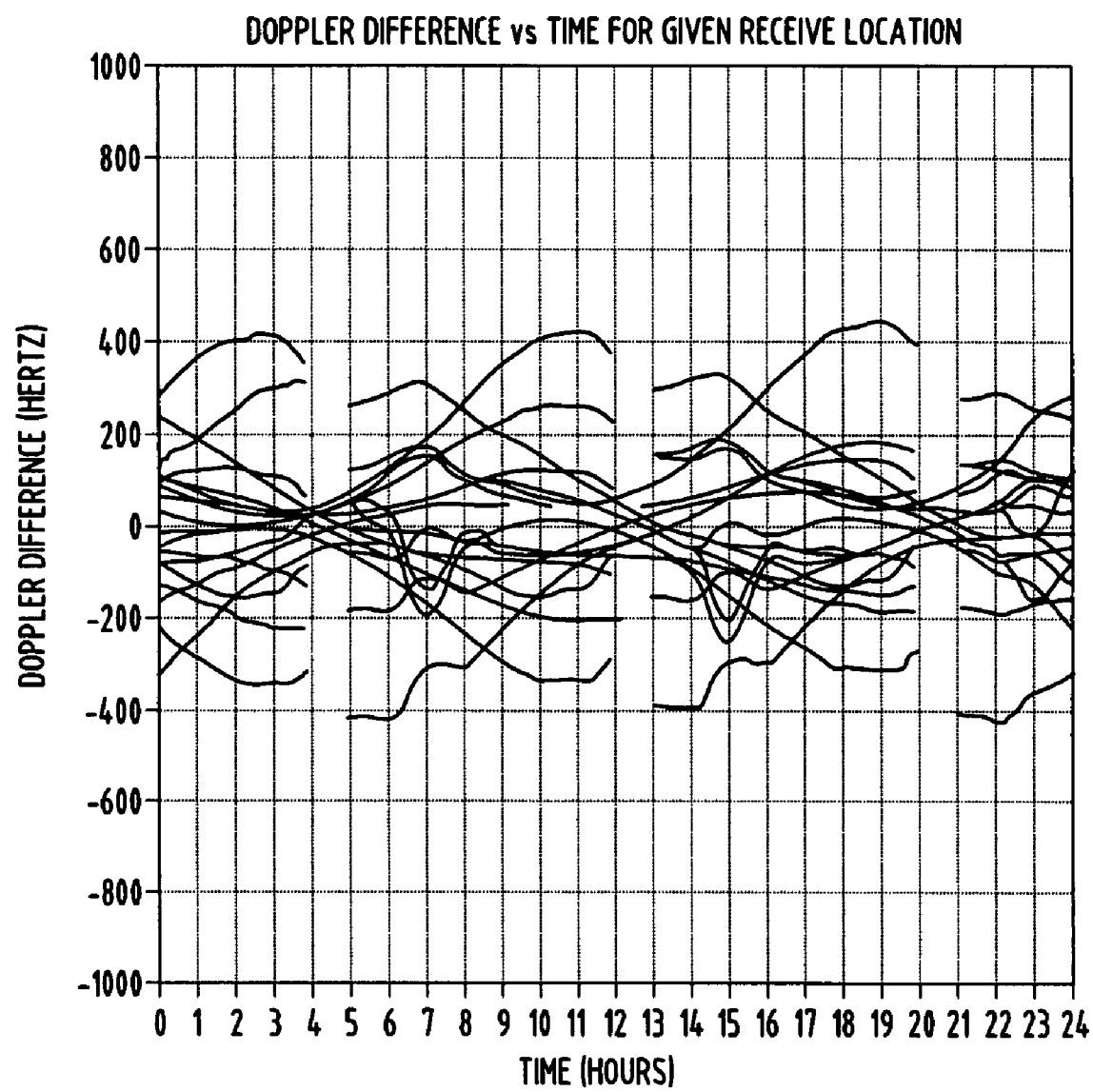
FIG. 5 is a chart illustrating the Doppler shift relationship among satellites as the satellites move along an orbital path in accordance with one embodiment of the present invention.

With continued reference to FIGS. 1-3 in addition to FIGS. 4-5, as the satellites 12 orbit around the orbital path 18, the satellites 12 are being activated and deactivated, such that the transmission power of the satellites 12 is being turned on and off, respectively. Since the active satellite continues to pass around the orbital path while being activated, the movement of the active satellite causes a Doppler effect on the signal received by the receiver 14. The Doppler effect can vary, depending upon the receive site or area with which the receiver 14 is receiving the signal. By way of explanation and not limitation, as shown in FIG. 4, the Doppler shift can range from approximately −4000 Hz to approximately 4000 Hz from the time that the satellite 12 is activated to the time that the satellite 12 is deactivated.

When one satellite 12 is deactivated, another satellite 12 is activated at substantially the same time. Since the Doppler shift of the active satellite can shift from approximately −4000 Hz to approximately 4000 Hz at the time of activation and deactivation, the Doppler effect typically shifts by approximately 6000 to 8000 Hz, when one satellite 12 is deactivated and another satellite 12 is activated. According to a disclosed embodiment, the receiver 14 operates at a very low signal-to-noise ratio (Eb/No), such as 0 dB, because of the error correction coding used has a very large coding gain. In order to maintain the operation of low signal-to-noise ratios, the receiver 14 cannot maintain phase lock loop and bit timing loops during such a large Doppler frequency shift.

According to one embodiment, in order to reduce the Doppler frequency shift, the satellite uplink station 16 controls or alters the frequency with which the signal is being transmitted from the satellite uplink station 16 to the satellite 12, which ultimately effects the frequency of the signal transmitted from the satellite 12 to the receiver 14. By altering the frequency of the uplinked signal, the Doppler frequency shift at the time of activation and deactivation of the satellites 12 can be reduced to acceptable levels.

According to a disclosed embodiment, as shown in FIG. 5, the Doppler frequency shift is approximately 800 Hz when one satellite 12 is deactivated and another satellite 12 is activated when the satellite uplink station 16 alters the frequency of the signal being transmitted to the satellite 12. According to one embodiment, the satellite uplink station 16 continuously alters the frequency of the signal by subtracting the average of the Doppler frequency shifts of multiple Earth locations from the frequency of the signal. Typically, the average is the average Doppler frequency shift measured at receive sites throughout the receiving area when the satellite 12 is in its normal orbit, and the satellite uplink is transmitting a constant frequency signal. According to a disclosed embodiment, the average can be determined by experimenting or simulation with a predetermined number of receive sites, such that the system 10 does not have to continuously monitor the Doppler shift during operation to continuously calculate the average.

By reducing the Doppler frequency shift at the time of activating and deactivating the satellites 12 by altering the frequency of the signal transmitted from the satellite uplink station 16 to the satellite 12, all the receivers 14 have less frequency restriction, and the receiver 14 can maintain phase lock loop and the bit timing loop while operating at low signal-to-noise ratios. Thus, the receiver 14 can continue to emit the output 38 when the satellites 12 shift from active to deactive, without a period where the receiver 14 emits an undesirable output, since the receiver 14 does not have to re-establish phase lock loop and bit timing loops.

Figure 6:
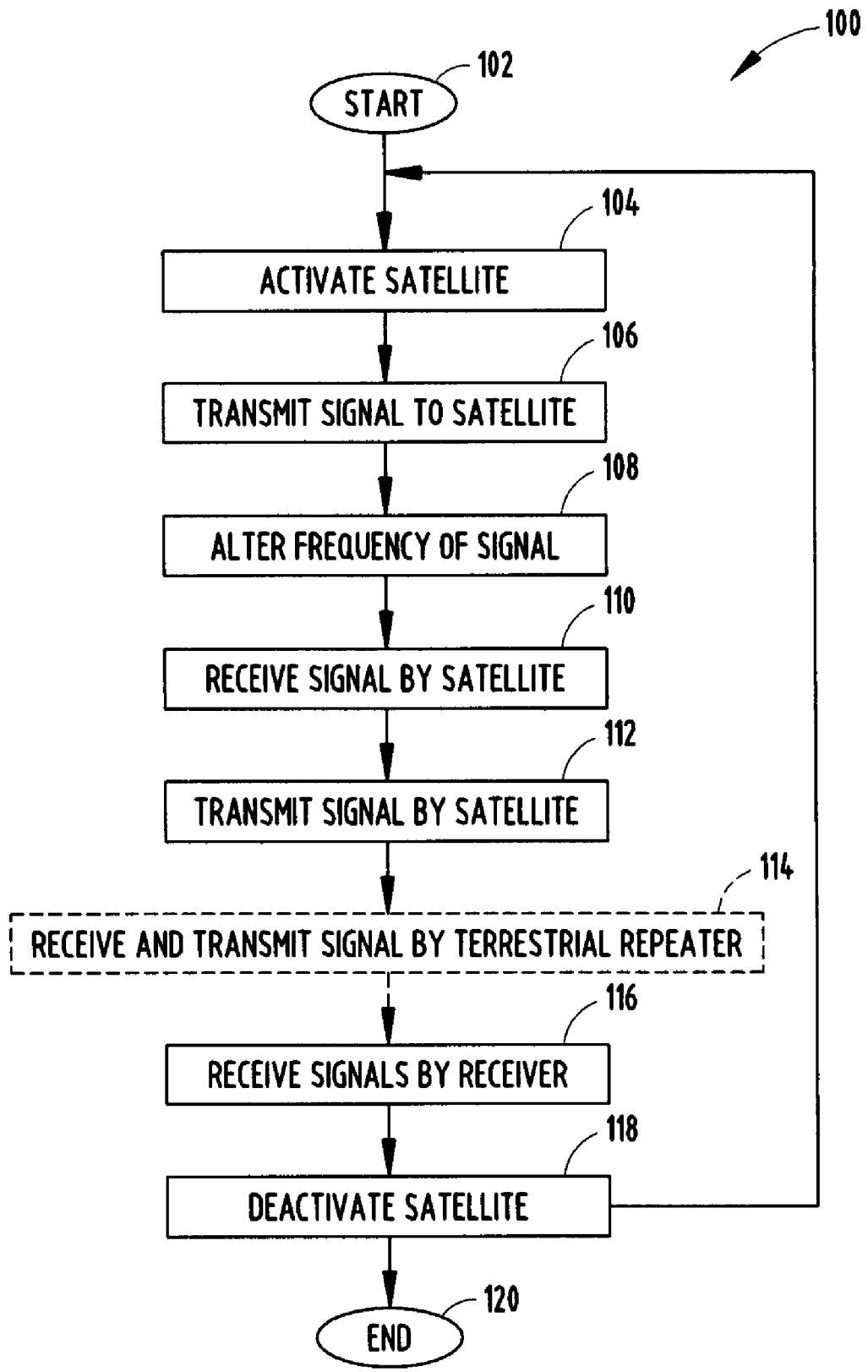
FIG. 6 is a flow chart illustrating a method of communicating signals in accordance with one embodiment of the present invention.

In reference to FIGS. 1-6, a method of communicating signals in accordance with one embodiment is generally shown in FIG. 6 at reference identifier 100. The method 100 starts at step 102, and proceeds to step 104, where the satellite 12 is activated. At step 106, the signal is transmitted from the satellite uplink station 16 to the satellite 12. The frequency of the signal is altered in order to prevent large Doppler frequency shifts at step 108. According to a disclosed embodiment, the signal is altered by continuously subtracting the average of the Doppler frequency shifts of multiple Earth locations from the frequency of the signal. Typically, the satellite uplink station 16 includes at least one routine, which can be implemented by a processor or the like, in order to alter the frequency of the signal uplinked to the active satellite.

The signal is received by the satellite 12 at step 110. The method 100 then proceeds to step 112, where the signal is transmitted by the satellite 12. According to one embodiment, the method 100 proceeds from step 112 to step 114, where the signals are received by the receiver 14, and the satellite 12 is deactivated at step 116. Alternatively, the method 100 proceeds from step 110 to step 112, where the signals can be received from the satellite 12 and re-transmitted by the terrestrial repeater 28. Typically, the terrestrial repeater 28 demodulates the received signal, and re-modulates the signal by re-transmitting the signal to the receiver 14. The method 100 then proceeds to steps 114 and 116. When the satellite 12 is deactivated at step 116, the method 100 substantially simultaneously activates a different satellite 12 at step 104, and the method ends at step 118. By altering the frequency of the signal at step 108, the Doppler frequency shift at step 118, when the satellites 12 are activated and deactivated, is reduced. Thus, the receivers 14 can continue to operate at low signal-to-noise ratios and maintain phase lock loop and bit timing loop.

By way of explanation and not limitation, in operation, the receiver 14 can be used with a vehicle 40, or other types of mobile devices or apparatuses. As the vehicle 40 is mobile, the satellite uplink station 16 alters the frequency of the signal being transmitted from the satellite uplink station 16 to the satellite 12. When the satellite 12 is shifted, such that one satellite 12 is activated and another satellite 12 is deactivated, the Doppler frequency shift is reduced, and the receiver 14 continues to function at low signal-to-noise ratios, and maintains phase lock loop and bit timing loops. It should be appreciated by those skilled in the art that the receiver 14 can be a mobile receiver or stationary receiver.

Advantageously, the system 10 and method 100 allows for a communication system to include a plurality of satellites 12, while using the satellite 12 in a predetermined orbital location to transmit the signals. The altering of the frequency by the satellite uplink station 16, which is being transmitted to the satellite 12, limits Doppler frequency shifts to suitable levels when the satellites 12 are activated and deactivated. The receiver 14 can continue to function at low signal-to-noise ratios without losing phase lock loop and bit timing loops when the satellites 12 are activated and deactivated. Thus, the output 38 of the receiver 14 does not have an undesirable audio and/or video effect from the activation and deactivation of the satellites 12.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A communication system comprising:
   a plurality of satellites including at least one active satellite;
   at least one receiver in communication with said plurality of satellites, wherein said at least one receiver receives a signal from said at least one active satellite; and
   at least one satellite uplink station in communication with said plurality of satellites, wherein said at least one satellite uplink station transmits said signal and alters a frequency of said signal based upon a location of said at least one active satellite to reduce a Doppler frequency shift when activating and deactivating said plurality of satellites, wherein said satellite uplink station continuously alters said frequency of said signal by subtracting an average of Doppler frequency shifts of multiple Earth locations from said frequency.

2. The communication system of claim 1, wherein each of said plurality of satellites are activated and deactivated based upon a location of each of said plurality of satellites within an orbital path.

3. The communication system of claim 1, wherein each of said plurality of satellites are substantially equally spaced along an orbital path.

4. The communication system of claim 1, wherein said plurality of satellites are highly elliptical orbit satellites.

5. The communication system of claim 1, wherein said at least one receiver is used with a vehicle.

6. A method of communicating signals, said method comprising the steps of:
   providing a plurality of satellites including at least one active satellite;
   transmitting a signal at a frequency to said at least one active satellite; continuously
   altering said frequency of said signal based upon a location of said at least one active satellite to reduce a Doppler frequency shift when activating and deactivating said plurality of satellites by subtracting an average of Doppler frequency shifts of multiple Earth locations from said frequency; and
   receiving said signal transmitted by said plurality of satellites by at least one receiver.

7. The method of claim 6 further comprising the step of activating each of said plurality of satellites based upon a location of each of said plurality of satellites within an orbital path.

8. The method of claim 6 further comprising the step of deactivating each of said plurality of satellites based upon a location of each of said plurality of satellites within an orbital path.

9. The method of claim 6, wherein each of said plurality of satellites are substantially equally spaced along an orbital path.

10. The method of claim 6, wherein said plurality of satellites are highly elliptical orbit satellites.

11. The method of claim 6, wherein said at least one receiver is used on a vehicle.

12. A method of communicating signals, said method comprising the steps of:
    providing a plurality of satellites including at least one active satellite;
    transmitting a signal at a frequency to said at least one active satellite;
    continuously altering said frequency of said signal based upon a location of said at least one active satellite to reduce a Doppler effect when activating and deactivating said plurality of satellites by subtracting an average of Doppler frequency shifts of multiple Earth locations from said frequency;
    receiving said signal transmitted by said plurality of satellites by at least one receiver;
    activating each of said plurality of satellites based upon a location of each of said plurality of satellites in an orbital path; and
    deactivating each of said plurality of satellites based upon a location of each of said plurality of satellites in said orbital path.

13. The method of claim 12, wherein each of said plurality of satellites are substantially equally spaced along an orbital path.

14. The method of claim 12, wherein said plurality of satellites are highly elliptical orbit satellites.

15. The method of claim 12, wherein said at least one receiver is used on a vehicle.

* * * * *